United States Patent [19]
Dybel et al.

[11] 4,062,055
[45] Dec. 6, 1977

[54] LOAD MONITORING SYSTEM WITH HIGH AND LOW LOAD CONTROL

[76] Inventors: William P. Dybel; Frank R. Dybel, both of 981 Wingate Road, Olympia Fields, Ill. 60461

[21] Appl. No.: 623,484

[22] Filed: Oct. 17, 1975

[51] Int. Cl.² .......................................... H01H 47/32
[52] U.S. Cl. .................................... 361/160; 361/170; 361/187
[58] Field of Search .......... 317/123, DIG. 5, DIG. 1; 100/99; 425/169; 361/160, 170, 187

[56] References Cited

U.S. PATENT DOCUMENTS

| | | | |
|---|---|---|---|
| 2,991,531 | 7/1961 | Gates | 100/99 X |
| 3,612,966 | 10/1971 | Dybel | 317/123 |

*Primary Examiner*—Harry E. Moose, Jr.
*Attorney, Agent, or Firm*—Leydig, Voit, Osann, Mayer & Holt, Ltd.

[57] ABSTRACT

A load monitoring system for indicating and controlling loads cyclically applied to force carrying members, such as the members of production presses. The system includes a high load limit circuit adapted to energize an overload detector when the loading on the member exceeds a predetermined maximum value and a low load limit circuit adapted to activate an underload detector when the loading on the member fails to reach a predetermined minimum value during a loading cycle. The low load limit circuit includes a control rectifier that is rendered conductive for a predetermined short pulse during each loading cycle in which the minimum load is exceeded and solid state logic means responsive to the failure of the rectifier to trigger during a loading cycle for activating the underload detector. The high load limit circuit includes a control rectifier that is rendered conductive only during an overload condition and solid state logic means for activating the overload detector in response to triggering of the rectifier. Once an overload or underload occurs, the circuits are adapted to be maintained in an overload or underload detecting condition until manually reset, notwithstanding an interruption of the main power supply to the system.

30 Claims, 6 Drawing Figures

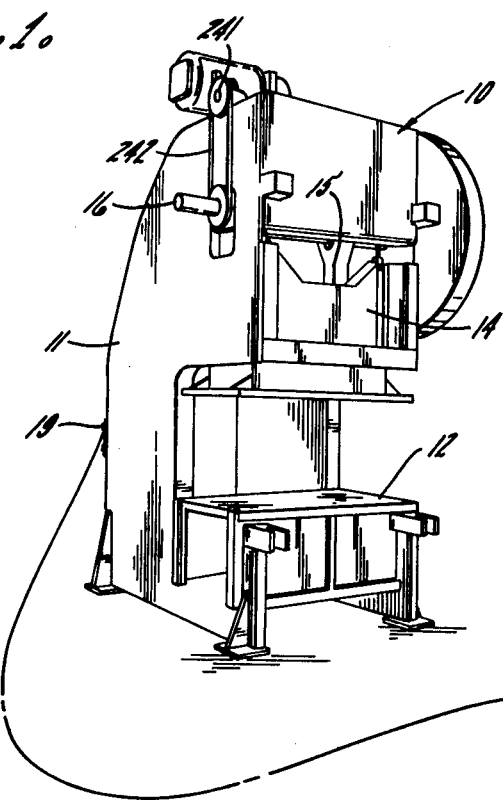
fig.1
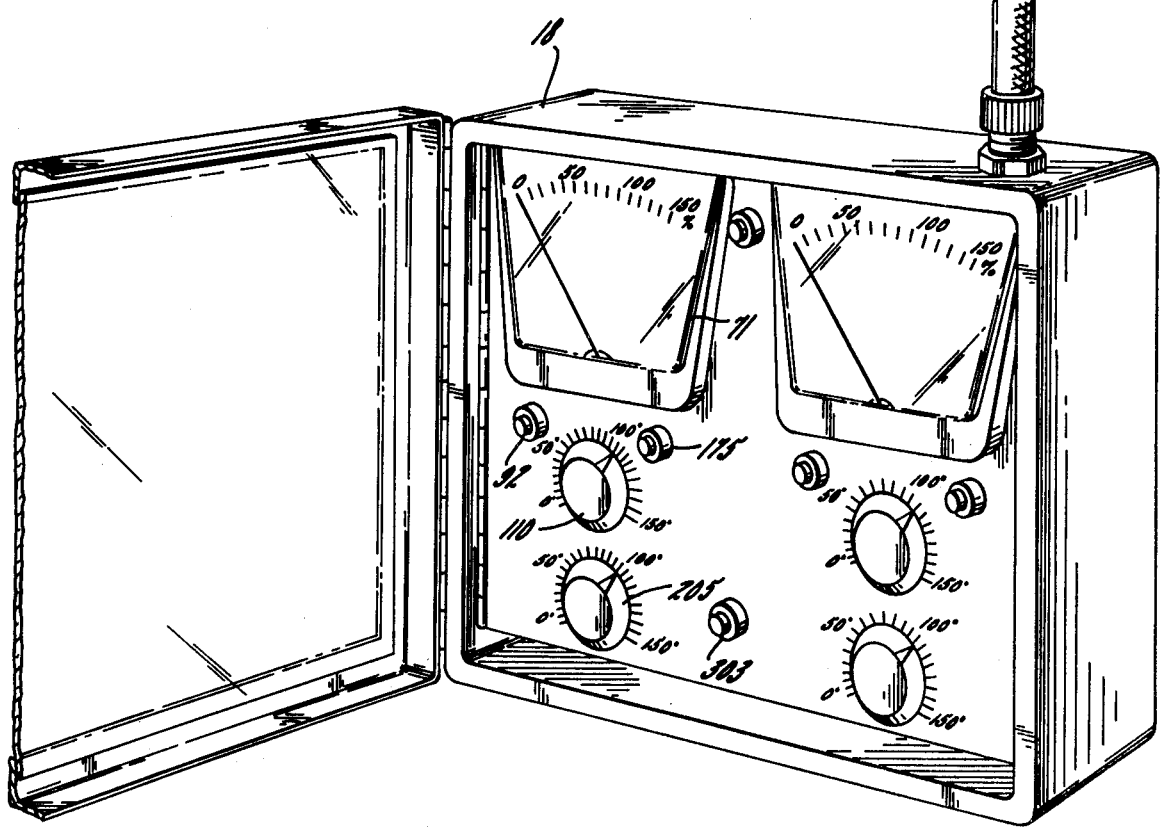

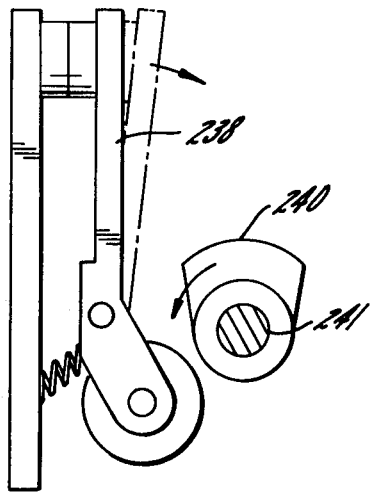
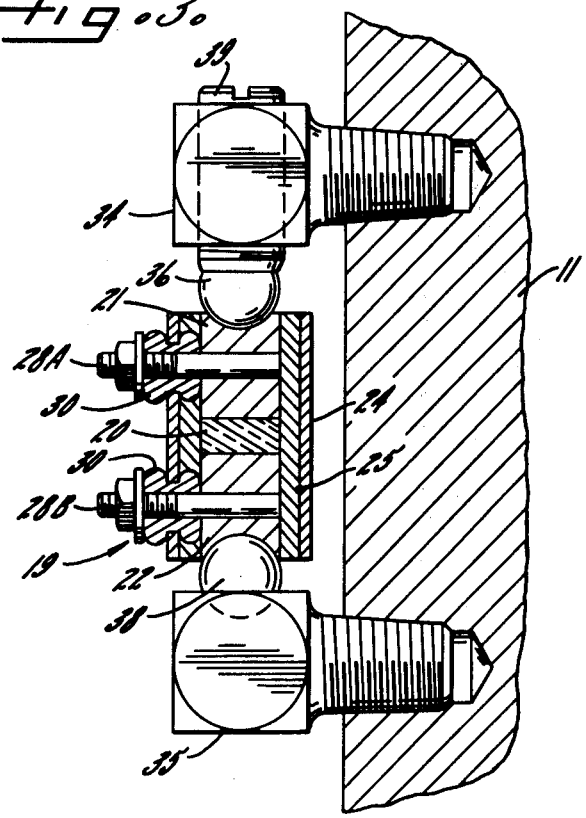

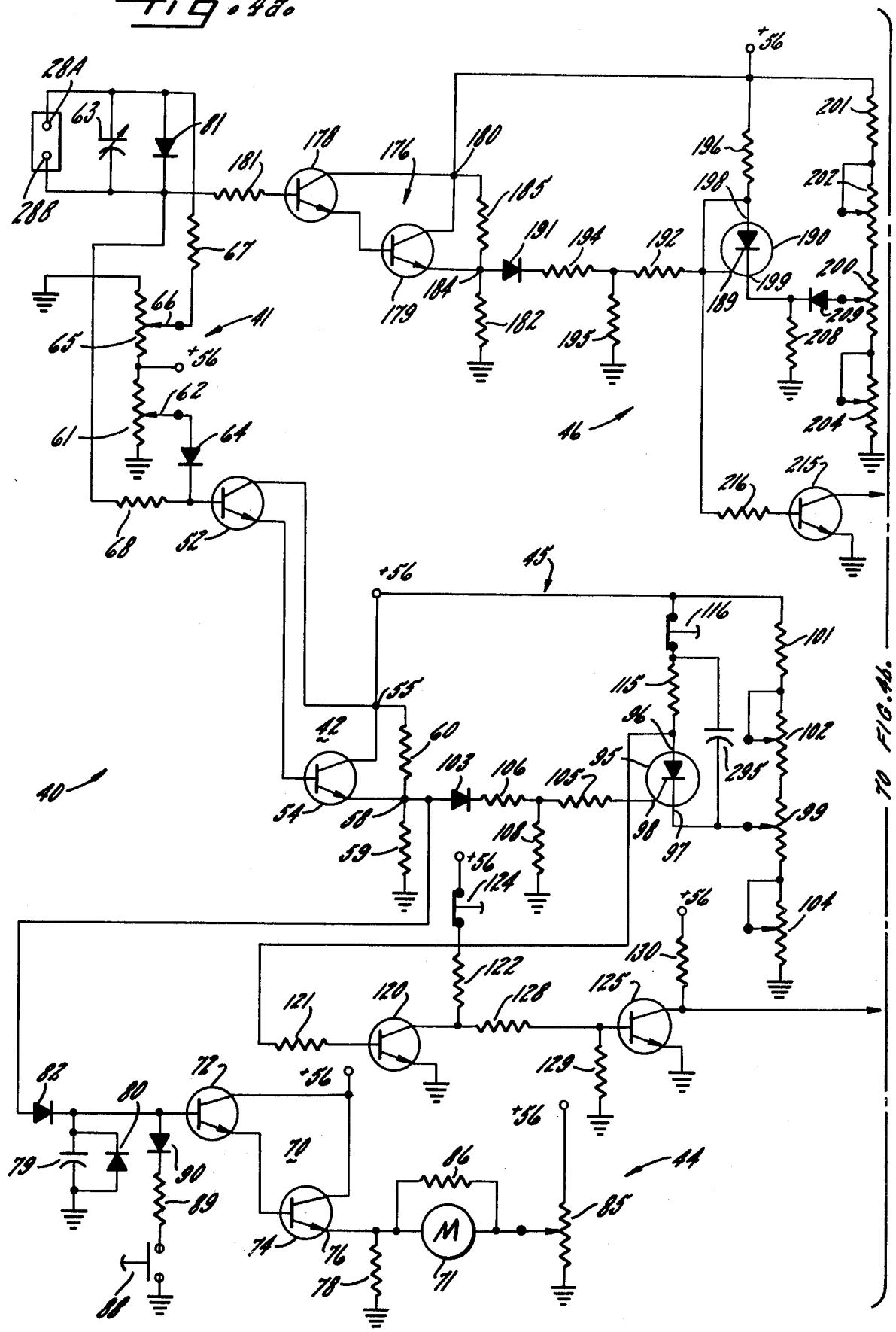

CAM SWITCH CONTROLLED SIGNAL

TIMER OUTPUT SIGNAL

CRANKSHAFT POSITIONS

NOR GATE 229

LOAD MONITORING SYSTEM WITH HIGH AND LOW LOAD CONTROL

DESCRIPTION OF THE INVENTION

The present invention relates generally to load sensing systems, and more particularly to systems for monitoring and controlling the loads on force carrying members, such as the pitmans or gaps of production presses.

In present high speed production presses, serious damage can result to the press if loads incurred by the force carrying members thereof exceed the rated capacity of the press. When a plurality of presses are incorporated in a production line with automated work handling equipment a number of successive presses can sometimes be damaged before a malfunction in the work transfer apparatus is detected. Load monitoring systems, such as shown in the applicant Frank R. Dybel's U.S. Pat. No. 3,612,966, presently are known for indicating the press loads and for automatically detecting if the load incurred by the force carrying member exceeds a predetermined value. While such systems have proven valuable in protecting presses from damage resulting from overloading, they nevertheless require an overload to occur before the problem can be detected. When a malfunction occurs in the automated production line and the workpiece is delayed in reaching a successive press, that press will not incur any significant loading during its working cycle. It has been found that if such a loss of loading can be readily made known to the press operator he is sometimes able to correct the problem before the jammed or improper workpiece reaches the successive presses.

In other types of presses the detection of an underload also can be invaluable. For example, in presses which automatically compress powdered metals into sintered or other finished form of a predetermined density, if the die were not filled to the proper level the forces incurred by the press during the working stroke would not reach the magnitude necessary to properly form the part. Detection of such underloading of the press, therefore, could greatly facilitate quality control of the production. Heretofore, however, systems have not been available for quickly, accurately, and economically detecting such underloading.

Accordingly, it is an object of the present invention to provide a load monitoring system for force carrying members that is adapted to reliably and instantaneously detect when the loading on a member exceeds a predetermined value and also when it does not reach a predetermined minimum value.

Another object is to provide a load monitoring system as characterized above that is adapted to detect the loss of loading or lack of a workpiece in a production press during its working stroke.

Yet another object is to provide a load monitoring system of the foregoing type that is adapted to count the pieces worked on by the press.

Still another object is to provide a load monitoring system of the above kind that is adapted to detect when the loading of the force carrying members of the press do not come within predetermined minimum and maximum values during a working cycle of the press.

A further object is to provide a load monitoring system of the above kind which includes memory means adapted to retain an overload or underload indication even though the main power supply of the system may be interrupted.

Yet another object is to provide such a load monitoring system that is adapted to indicate a break in lines connecting stress sensing transducers mounted on the press member to the monitor.

Another object is to provide such a load monitoring system that is relatively simple in construction, and thus, is economical to manufacture.

Other objects and advantages of the invention will become apparent upon reading the following detailed description and upon reference to the drawings in which:

FIG. 1 is a perspective of a load monitoring system of the present invention mounted on a typical punch press which is shown at a reduced scale;

FIG. 2 is an enlarged view of a cam switch utilized in the illustrated press;

FIG. 3 is an enlarged fragmentary section of one of the stress sensing transducers for the illustrated load monitoring system;

FIGS. 4a and 4b are an electrical diagram of the sensing circuit for the illustrated monitoring system.

Figure 4B:
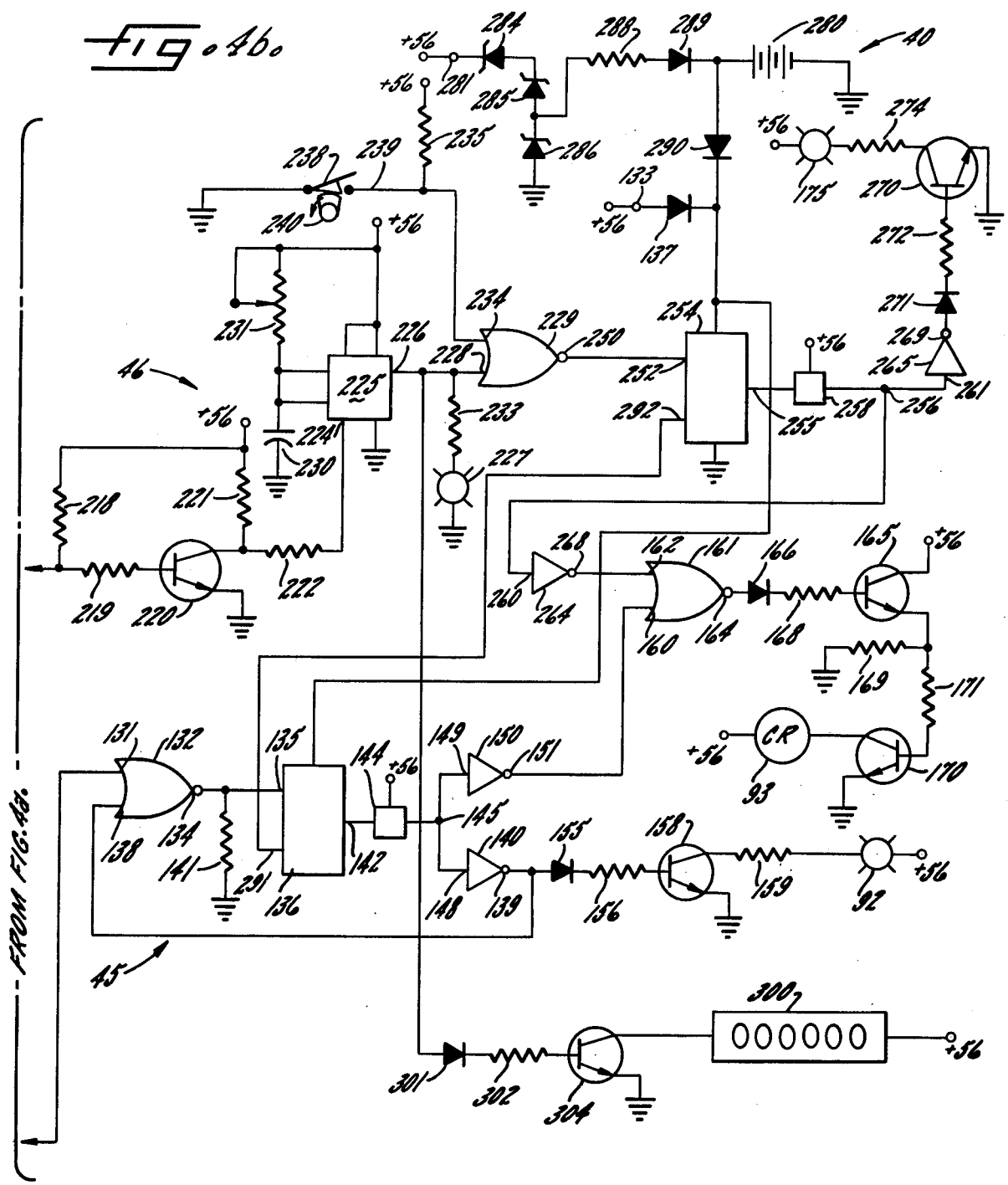

While the invention is susceptible of various modifications and alternative constructions, a certain illustrative embodiment has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the invention.

Referring now more particularly to FIG. 1 of the drawings, there is shown a punch press 10 having a load monitoring system embodying the present invention. The press 10 is of a conventional type having a gap or frame 11, a bed 12 for supporting a die and workpiece and a ram 14 mounted for reciprocating raising and lowering movement. The ram 14 is supported and driven by a crank of pitman 15 which in turn is driven by an eccentric mounting on a crankshaft 16. As is known in the art, for every 360 degrees of crankshaft rotation, the ram 14 is lowered through its working stroke and returned to its original raised position.

The load monitoring system includes a monitor 18 connected to a piezoelectric stress sensing transducer 19, which in this case is mounted upon the gap 11 of the press. It will be understood that the transducer 19 could be mounted at other locations on the gap or on other members of the press, such as the pitman, which incur significant loadings during a working cycle of the press. The transducer 19, which may be a type described in more detail in the applicant Frank R. Dybel's U.S. Pat. No. 3,612,966, includes a piezoelectric ceramic crystal 20 positioned between a top terminal block 21 and a bottom terminal block 22 with the top and bottom faces of the crystal 20 being in contact with and against the surface of each of the respective terminal blocks. As shown in FIG. 3, the terminal blocks 21, 22 and crystal 20 are surrounded by a metallic sheath 24 which serves as a magnetic and electric shield. The sheath 24 is slightly larger than the terminal blocks and crystal to provide space for a surrounding layer 25 of an encapsulating and insulating plastic material. Leading from the terminal blocks through the insulating layer 25 and the metallic sheath 24 are terminals 28A, 28B with suitable connections for attachment of leads. The terminals 28A, 28B and hence the terminal blocks are electrically insulated from the sheath 24 at the passageway therethrough by terminal insulators 30. The sheath 24 preferably is grounded to the shield of a shielded cable 27 connecting the transducer to the monitor 18.

The transducer 19 is mounted on the gap 11 so that a line normal to the crystal faces at the interfaces between the crystal 20 and the terminal blocks 21, 22 is parallel to and aligned with the stress to be measured in the pitman 11 when under load during a working cycle. The transducer 19 is supported between two points in spaced relation to the pitman 11 to provide what may be characterized as a parallel mechanical circuit for shunting a small portion of the stress in the member 11 to the transducer 19. The transducer in this case is clamped between the ends of two brackets 34, 35 that are screwed into the force carrying pitman 11. The ends of the brackets 34, 35 between which the transducer is clamped are provided with ball and socket joints including balls 36 and 38 that engage sockets in the terminal blocks 21 and 22, respectively. The brackets preferably are electrically insulated from the terminal blocks by the balls 36 and 38 which may be made of a refractory insulating material.

In order to permit desired prestressing of the transducer crystal 20, a set screw 39 is provided in the end of the top bracket 34. After the transducer 19 is in position, the set screw 39 is screwed to secure it under a clamping pressure that places the crystal 20 in a prestressed condition. The amount to which the crystal is prestressed must be sufficient so that it is in a stressed condition under all conditions of loading on the member. In such condition, during the working cycle of the press, the resulting changes in stress on the pitman 11 will act upon the transducer through its support bracketry 34, 35 and cause the piezoelectric crystal 20 to produce relatively high voltage output signals proportional to the stress changes. These electrical signals are transmitted to the monitor 18. While the illustrated monitor is of a two point or channel type, having two sets of controls and meters for monitoring loads from transducers located at two points on the press, since each channel is substantially identical only one will be described in detail.

In accordance with the invention, the monitor includes sensing circuitry that is responsive to output signals from the transducer to detect whether forces incurred by press members during its working cycle fail to reach a predetermined minimum value or exceed a predetermined maximum value. Referring to FIGS. 4a and 4b, the monitor 18 has a sensing circuit 40 that includes an input circuit 41 for a current amplifier 42, a load indicating circuit 44, a high load limiting circuit 45, and a low load limiting circuit 46. The output terminals 28A, 28B of the transducer 19 are coupled to the input circuit 41 for the current amplifier 42. The amplifier 42 consists of a pair of direct-coupled transistors 52, 54 of the NPN variety. In the configuration shown, the transistors form what is commonly called an emitter follower type Darlington pair in that they have their collectors connected together at a point 55 and with the emitter of the first transistor directly attached to the base of the second transistor. The collector connected 55 is tied directly to a positive DC supply 56 while the emitter terminal 58 constitutes the output terminal for the amplifier 42 and is connected to ground through a load resistor 59. A stabilizing resistor 60 having a value at least ten times larger than the load resistor 59 connects the output terminal 58 to the positive supply 56. Typical silicon NPN transistors presently available may have current amplification factors of 100 or more when biased in their linear conductive range. Thus, in cascade, two such transistors will provide an amplification factor of 10,000. The input impedance of the amplifier 42 will be approximately 10,000 times the effective load resistance at the emitter terminal 58 which, for present purposes, will be at least 100 kilohms, making the input impedance to the amplifier 42 at least 1,000 megohms.

To obtain such a high input impedance from the amplifier 42 during static conditions, it is necessary to properly bias the input to render the transistors conductive in their linear range. To this end, the input circuit 41 includes a first voltage divider 61 connected between ground and the positive supply terminal 56. The voltage divider 61 in the present instance is variable through the movement of a wiper arm 62. The divider output voltage present on the wiper arm 62 is applied to the base of the transistor 52 via a diode 64 which is poled to allow bias current to flow into the transistor 52. It is desirable to establish a bias voltage on the wiper arm 62 of the voltage divider which will render the transistors 52 and 54 conductive near the lower current end of their linear region of conduction. Assuming the transistors 52, 54 and the diode 64 to be silicon devices, a voltage, such as about 1.8 volts, would have to be impressed across the three semi-conductor junctions before linear conduction is established. A second voltage divider 65, also in the form of a potentiometer, has a wiper arm 66 for establishing a reference voltage substantially equal to the bias voltage at the base of the first transistor 52 of the amplifier 42. The transducer 19 in this case is part of a branch that includes the transducer 19 itself, a pair of bandpass control resistors 67, 68 in series with the transducer, and a conditioning capacitor 63 in parallel with the transducer. With the voltages at the opposite ends of the transducer branch being equal to the static condition of the circuit, zero current will flow through the transducer while it is in its inactive condition.

When an increase in stress occurs in the piezoelectric transducer 19, such as when a compressive force is incurred by the press member during the working stroke of the press 10, the piezoelectric crystal 20 produces a voltage across the transducer of a polarity indicated in FIG. 4a. This voltage will be proportional to the stress applied, but it will be conditioned or limited by the loading effect of the capacitor 63 so that its full load output is approximately 10 volts. Since the capacitor 63 is in parallel with the transducer 19, it does not act as an external biasing element so as to reduce the effectiveness of the transducer. As a result, as the voltage across the transducer rises, the output voltage from the amplifier 42 also rises in a 1:1 ratio. However, the current available to drive the emitter load resistors of the amplifier 42 will be several orders of magnitude greater than the transducer current. The only load impressed upon the transducer, other than that of its conditioning capacitor 63, will be the dynamic input impedance of the transistor pair 52, 54 and the reverse impedances of the directional diode 64, both of which are in excess of 10 meghoms and provide a degree of isolation for the transducer.

The indicating circuit 44 is connected to the output of the amplifier 42 at the emitter terminal output point 58 and includes a current amplifier 70 which in turn has its output connected to a suitable meter 71. The amplifier 70 again is a Darlington arrangement of direct coupled transistors 72, 74 having their collectors connected at a common point 75 and with the emitter of the first transistor attached to the base of the second transistor. The collector connection 75 is tied to the positive DC supply 56 while the emitter terminal 76 constitutes the output terminal for the amplifier 70 and is connected to ground through the resistor 78. Current flowing from the amplifier 42 charges a capacitor 79 connected in a line extending from the input of the transistor 72 to ground for providing a sufficiently prolonged voltage to maintain a current flow through the amplifier 70 and meter 71 to obtain the necessary meter reading. A directional diode 80 in this case is connected in parallel with the capacitor 79, and a diode 82 is included in the input line to prevent reverse current flow from the capacitor 79.

It will be seen that the output signal from the amplifier 70 into the meter 71 will be proportional to the stress communicated to the transducer 18 from the press pitman. To properly establish or calibrate the maximum and minimum readings of the meter, the output terminal of the meter 71 is connected to the wiper of a potentiometer 85 connected between ground and the positive supply terminal 56. A dampening resistor 86 is connected in parallel with the meter. The meter 71 in this case, when properly calibrated, is adapted to indicate the loading on the press as a percent of its rated or 100% capacity. Following a work stroke of the press and the resulting load indication by the meter 71, the meter may be quickly returned to zero by depressing a reset button 88 connected in series with the resistor 89 and a diode 90 which has the effect of unloading the capacitor to ground.

In order to limit the stress applied to the force carrying member to a predetermined value, the high load limiting circuit 45 is adapted for selectively controlling overload detection means, which in the illustrated embodiment includes an overload indicator light 92 and a main control relay 93 for the press. For this purpose, the high load limiting circuit 45 includes a control rectifier 95 having anode, cathode and gate terminals 96, 97 and 98, respectively with the cathode terminal 97 referenced to a variable voltage at the wiper of a potentiometer 99. The potentiometer 99 forms one part of a voltage divider connected between ground and the positive supply 56, which divider also includes a fixed resistor 101, a "coarse" control rheostat 102 and a "fine" control rheostat 104. The gate terminal 98 of the control rectifier 95 is connected to the output point 58 of the amplifier 42 through a directional diode 103, an input resistance 105 and a voltage divider consisting of resistors 106 and 108. The anode terminal 96 is coupled to the DC power supply 56 through a resistor 115 and a normally closed reset switch 116.

Several factors are operative to determine the transducer voltage necessary to trigger the rectifier into conduction for operating the overload indication means. The control rectifier 95, typically a silicon device designated as an SCR, is rendered conductive when the voltage at the gate terminal 98 exceeds the reference voltage at the cathode terminal 97 by a fixed amount. In the present instance, the forward current of the rectifier 95 is limited by the resistance of the lower branch or leg of the potentiometer 99, together with the resistance of the rheostat 104. The voltage at which the rectifier will trigger, therefore, can be selectively established by adjusting the reference voltage divider to the cathode 97. The potentiometer 99 can be manually adjusted by a dial 110 located in the front panel of the monitor 18 so that, after proper calibration of the unit, the user may easily choose maximum loading that may be incurred by the force carrying member before the threshold voltage of the SCR is exceeded. In the present instance, the dial 110 again is marked in terms of a percent of the rated press capacity. When the loading on the press exceeds the dial setting, the resulting transducer signal will trigger the rectifier 95 into conduction. The lower branch of the voltage divider for the cathode terminal 97 preferably is designed with a relatively low impedance so that once the SCR is triggered it will remain conducting until the system is manually reset.

In keeping with the invention, solid state logic means is provided for quickly and reliably acting upon the overload detection means in response to conduction of the SCR 95 and for indefinitely holding or locking in an overload indication until proper resetting of the system. To this end, the anode 96 of the SCR 95 is coupled to the base of a transistor 120 through a resistor 121. The emitter terminal of the transistor 120 is connected to ground while the collector terminal is coupled to the DC power supply 56 through a loading resistor 122 and a normally closed reset switch 124. The collector terminal of the transistor 120 also is connected to the base of a transistor 125 through a voltage divider consisting of resistors 128 and 129. The transistor 125 similarly has its emitter terminal connected to ground and its collector terminal coupled to the DC power supply 56 through a resistor 130. The collector terminal of resistor 125 is coupled to an input terminal 131 of a NOR gate 132 which has an output terminal 134 coupled to a set point 135 of a solid state latch 136. The latch 136 is energized by the power supply 56 from a terminal 133 connected to the latch through a diode 137.

During normal operating conditions of the press, with the overload control dial set at the rated loading for the press, the transducer signals to the gate 98 of the SCR 95 will not exceed the predertermined set threshold voltage at the control terminal 97 so that the SCR is in a nonconductive state with a relatively high voltage potential existing at the anode terminal 96 which feeds the base of the transistor 120. The high potential at the base of the transistor 120 causes the collector terminal of the transistor 120 and the base of the transistor 125 connected thereto to be drawn essentially to ground rendering the transistor 125 nonconductive and creating a high voltage potential at the collector terminal of that transistor and at the input terminal 131 of the NOR gate 132. Since the other input terminal 138 of the NOR gate 132 is coupled to an output terminal 139 of an inverting buffer 140, which during normal operation of the press is in a low state as will become apparent, the unlike potentials at the NOR gate input terminals 131, 138 creates a normally low state at the output terminal 134. The output terminal 134 is coupled to ground through a loading resistor 141 and, as indicated above, also to the set terminal 135 of the latch 136. The resulting normally low potential at the latch set terminal 135 maintains a high potential at a latch output terminal 142 which feeds through a normally open transmission gate 144 to create a high potential at an output point 145. For maintaining the transmission gate 144 in an open condition during normal operation, the DC power supply 56 is coupled to an enabling point of the gate in a known manner. The normally high potential at output point 145 feeds input terminals 148, 149 of respective inverting buffers 140, 150 to create normally low potentials at output terminals 139, 151 of the inverting buffers. As indicated previously, the low potential at the output terminal 139 of the inverting buffer 140 is coupled back to the input terminal 138 of the NOR gate 132 for maintaining it at its normally low state.

An operating circuit for the overload indication light 92 is coupled to the output terminal 139 of the inverting buffer 140. The output terminal 139 in the present instance is coupled through a directional diode 155 and a resistor 156 to the base of a transistor 158. The emitter terminal of the transistor 158 is connected to ground while a line including a loading resistor 159 and the overload indication light 92 connects the collector terminal of the transistor 158 to the DC power supply 56. It can be seen that during normal operating conditions of the press, the low potential at the inverting buffer output terminal 139 causes the transistor 158 to be in a nonconductive condition causing a high resistance that prevents current flow through the light 92.

The press control relay 93 is included in a circuit coupled to the output terminal 151 of the inverting buffer 150 and in this case is maintained in a normally energized condition. To this end, the inverting buffer output terminal 151, which is at a normally low potential, is coupled to an input terminal 160 of a NOR gate 161. The NOR gate 161 has a second input terminal 162 which, as will become apparent, also is maintained in a normally low potential, so that output terminal 164 of the NOR gate 160 is maintained at a normally high potential. The NOR gate output terminal 164 feeds the base of a transistor 165 through a diode 166 and resistor 168. The collector terminal of the transistor 165 is connected to the DC power supply 56 and the emitter terminal is connected to ground through a resistor 169 and to the base of a second transistor 170 through a resistor 171. The emitter terminal of the transistor 170 is connected to ground and the collector is coupled to the DC power supply 56 by a line that includes the overload relay 93. It will be seen that the normally high potential at the output terminal 165 of the NOR gate 161 feeds the base of the transistor 165 causing that transistor to be in a conductive state so that substantially the entire voltage appears across the resistor 169 creating a high potential at the emitter terminal of the transistor 165 which in turn feeds the base of the transistor 170. The transistor 170 is thereby in a normally conductive state causing the collector terminal thereof to be drawn essentially to ground to permit conduction through the relay 93. It will be understood that the energized relay 93 may be utilized to maintain a suitable clutch control switch for the press in a closed position to permit operation of the press.

In the event that the loading on the press member being monitored exceeds the setting on the overload control dial 110, the amplified transducer signal to the SCR gate 98 will exceed the predetermined threshold voltage causing the SCR to become conductive. In response to this event, the foregoing logic circuitry will instantaneously and reliably energize the overload indication light 92 and de-energize the main clutch control relay 93 to permit the clutch control switch to be opened for shutting down the press. It will be seen that when the SCR is rendered conductive on an overload, the anode terminal 96 and the base of the transistor 120 connected thereto are drawn essentially to ground. The lowering of the base potential of the transistor 120 will create a high potential at its collector terminal which feeds the base of the transistor 125 causing that transistor to then become conductive and drawing its collector terminal to ground causing a low potential at the input terminal 131 of the NOR gate 132. Since the input terminal 138 also is at a low potential, the like low inputs to the NOR gate cause the output terminal 134 to go to a high potential which feeds the set point 139 of the latch 136 in turn causing the latch output terminal 142 to go to a low potential drawing the point 145 and inputs 148 and 149 of the inverse buffers 140, 150 to a low potential through the open transmission gate 144. The low potentials at input terminals 148 and 149 will cause the output terminals 139 and 151 of the respective inverse buffers to go high. The high potential at the terminal 139 feeds the base of the transistor 158 causing its collector to be pulled essentially to ground so as to cause conduction through the overload indication light 92. The light 92 may be located in the front panel of the monitor 18, as shown in FIG. 1, so that the operator can readily observe that an overload has occurred.

Simultaneously, the control relay 93 will be de-energized for stopping the press. When the inverting buffer output terminal 151 goes high the resulting high potential will be directed to the NOR gate input terminal 160. Since the input terminal 162 remains at a low potential, the unlike inputs will cause the output terminal 164 of the NOR gate 161 to drop to a low potential drawing down the base of the transistor 165 and rendering it nonconductive. As a result, the voltage drop between the DC power supply 56 and ground will be essentially across the transistor 165 causing the emitter terminal to go to a low potential which draws down the base of the transistor 170 rendering it nonconductive and creating a high impedance that prevents further current flow through the control relay 93. Such de-energization of the relay 93 can be utilized to open the main clutch control switch for the press and shut down its operation.

In carrying out the invention, the low load limiting circuit 46 includes solid state logic means adapted to also de-energize the control relay 93, as well as energize a low load indication light 175, when the loading on the press member fails to reach a preset value. The circuit 46 includes a low load limiting amplifier 176 consisting of a pair of transistors 178, 179 directly coupled in a Darlington arrangement with their collectors connected at a common point 180 and the emitter of the first transistor 178 directly attached to the base of the second transistor 179. The base of the first transistor 178 is connected to the transducer terminal 28B through a resistor 181 and the emitter terminal of the second transistor 179 is coupled to ground through a loading resistor 182. The collector connection 180 is tied directly to the DC power supply 56, and a stabilizing resistor 185 connects an output point 184 of the amplifier to the power supply 56. The output point 184 of the amplifier 176 feeds a gate terminal 189 of a silicon controlled rectifier 190 through a directional diode 191, an input resistance 192, and a voltage divider consisting of resistors 194 and 195. The SCR 190 has its anode terminal 198 connected to the DC power supply 56 and its cathode terminal 199 coupled to ground through a stabilizing resistor 208.

For selectively controlling the conductive state of the SCR 190, and in turn the underload indication means, as will become apparent, the cathode terminal 199 also is referenced to a variable voltage at the wiper of a potentiometer 200. The potentiometer 200 forms one part of a voltage divider connected between ground and the positive power supply 56, which divider also includes a fixed resistor 201, a "coarse" control rheostat 202, and a "fine" control rheostat 204. The threshold voltage at which the rectifier 190 will conduct, therefore, can be established by adjustment of the reference voltage divider to which the cathode 199 is coupled. The potentiometer 200 can be manually adjusted by means of a hand dial 205 located in the front panel of the monitor 18 and, like the overload control dial 110, the low load control dial 205 may be calibrated in terms of a percentage of the rated press capacity. In this case, however, it is intended that the dial 205 be set slightly below, such as 1 or 2 percent, the desired minimum loading on the press member during the normal working stroke. During normal operation of the press, therefore, the loading on the press member will exceed the minimum load setting on the dial 205, and as a result, the amplified transducer signal to the rectifier gate 189 will exceed the predetermined reference voltage at the cathode terminal 199 so as to render the rectifier conductive during each stroke of the press.

The SCR 190 is adapted to conduct only for a short pulse each time it is fired and then automatically return to a nonconductive state. In the present instance, in order to limit the current flow through the rectifier 190 to a short pulse during each firing, the anode terminal 198 is connected to the power supply through a high impedance resistor 196, such as on the order of 2 megohms, and a diode 209 provided in the line connecting the cathode terminal 199 to the potentiometer 200 is poled to block current flow to the potentiometer. It will be seen that while the rectifier 190 is rendered conductive during each stroke of the press, because of the high impedance of the resistor 108, the current flow will be relatively small. Accordingly, when the transistor signal at the gate terminal 189 falls below the reference voltage at the cathode terminal 199 following the completion of the working stroke of the press, the rectifier 190 will again return to its inactive or nonconductive state.

In carrying out the invention, the low load limiting circuit 46 includes means responsive to failure of the rectifier 190 to become conductive during a working cycle of the press for indicating that the loading on the press member did not reach the preset value and for automatically shutting down the press. For this purpose, the anode 198 of the rectifier 190 is coupled to a circuit for controlling the low load indication light 175 and the main control relay 93. In the illustrated embodiment, the anode 198 is connected through a resistor 216 to the base of a transistor 215, the emitter terminal of which is grounded and the collector terminal of which is coupled to the base of a transistor 220 through a resistor 219. The collector terminals of the transistors 215, 220 each are coupled to the DC power supply through respective resistors 218 and 221. The emitter terminal of the transistor 220 also is grounded while its collector terminal is connected to the input terminal 224 of a timer 225 through a resistor 222. The timer 225 is coupled to the power supply 56 and has an output terminal 226 coupled to an input terminal 228 of a NOR gate 229. The timer 225 may be of a known "interval on" type which in response to a negative impulse to the input terminal 224 will permit conduction from the power supply 56 to the output terminal 226. For permitting selective adjustment of the timing interval, a capacitor 230 and adjustable resistor 231 are coupled to the timer in the usual manner.

To permit easy determination of whether the timer 136 is generating output pulses, either when setting the potentiometer 200 to a zero condition during initial calibration of the system or for observing the performance of the system, a light 227 and resistor 233 are coupled between the output terminal 226 of the timer and ground. Thus, each time the timer 225 is activated the output of the timer will not only feed the NOR gate input terminal 228 but will energize the light 227 for the interval of the timing cycle.

The NOR gate 229 has a second input terminal 234 that is coupled to the DC power supply 56 through a resistor 235. For the purpose of creating a low potential at the NOR gate input terminal 234 for a predetermined relatively short interval during each cycle of the press at a time when the timer 225 is normally in an activated state, a cam actuated switch 238 is provided in a line 239 connected between ground and the input terminal 234 of the NOR gate. The switch 238 in this case is actuated by a cam 240 mounted on a shaft 241 which is driven by the press crankshaft 16 through a chain 242, as shown in FIGS. 1 and 2. It can be seen that the cam 240 is thereby rotated in timed relation to rotation of the crankshaft 16 and movement of the ram 14. It also will be understood that the cam 240 may be appropriately designed to close the switch 238 for a determined interval. In the illustrated embodiment, the cam is designed to close the switch immediately following the end of a working stroke, such as from about 190° to 200° of crankshaft rotation, assuming that the bottom dead center position of the ram is the 180° position. In such case, during each working cycle of the press, the switch will couple the input terminal 234 of the NOR gate 229 to ground for 10° of crankshaft rotation during which time the input terminal 234 will be drawn down to a low potential.

The output terminal 250 of the NOR gate 229 is coupled through a diode 251 to a set point 252 of a solid state latch 254 which is normally energized from the terminal 133 of the DC power supply 56. The latch 254 has an output terminal 255 connected to an output point 256 through a normally open transmission gate 258 that is held in an open condition through the connection of its enabling point to the DC power supply 56. The output point 256 is connected to input terminals 260, 261 of respective inverting buffers 264, 265. The inverting buffer 264 has an output terminal 268 coupled to the input terminal 162 of the NOR gate 161. The inverting buffer 265 has an output terminal 269 coupled to the base of a transistor 270 through a diode 271 and a resistor 272. The emitter terminal of the transistor 270 is coupled to ground while a line containing a resistor 274 and the low load indicator light 175 is coupled between the collector terminal and the DC power supply 56.

Figure 5:
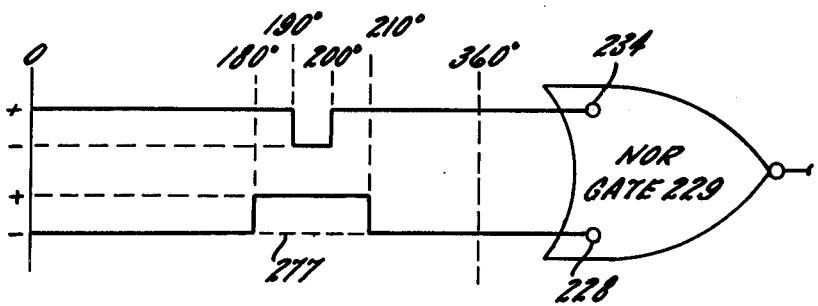
FIG. 5 is a chart diagrammatically illustrating the voltage sequence impacted to a NOR gate in the illustrated circuitry during a working cycle of the press.

The operation of the low load limiting circuit 46 can be best illustrated when the circuit diagram shown in FIGS. 4a and 4b is considered in the light of FIG. 5 which is a diagrammatic illustration of voltage sequence to the input terminals 228 and 234 of the NOR gate 229 during an operating cycle of the press. As described above, during normal operation of the press, the loads incurred by the press member being monitored will exceed the minimum load setting on the low load control dial 205 causing the SCR 190 to become conductive for a short interval during each working cycle. When the rectifier 190 conducts, the anode terminal 198 is drawn to a lower potential which in turn lowers the potential at the base of the transistor 215. The lowering of the base potential of the transistor 215 increases the potential at the collector terminal of that transistor which in turn feeds the base of the transistor 220 causing it to become conductive drawing its collector terminal essentially to ground and resulting in a negative impulse to the input terminal 224 of the timer 225 to initiate the timing cycle. The timer 225, therefore, will feed the input terminal 228 of the NOR gate 229 with a high potential during the set interval. In the illustrated embodiment, the timer 225 is set so that upon triggering it conducts for a period of about 30° of crankshaft rotation.

The sequence of the timer output voltage to the NOR gate input terminal 228 is shown in FIG. 5 in relation to the crankshaft position. It can be seen that the output of the timer does not conduct during the first 180° of crankshaft rotation so that the NOR gate input 228 is at a low potential. At about the bottom dead center position of the press ram, the signal is sufficiently great to trigger the SCR 190 which has the effect of activating the timer to create a high potential at the terminal 228 which exists for the next 30° of crankshaft rotation. At that point, the timer automatically shuts off to return the NOR gate input 228 to a low potential during the remainder of the cycle.

The sequence of the input to the NOR gate terminal 234 also is illustrated in FIG. 5. Since the switch 238 in the illustrated system is in an open position during the first 190° of crankshaft rotation, the input terminal 234 has a high potential, being fed from the DC power supply 56. The voltage is then lowered to ground for the next 10° interval when the switch 238 is closed, and is then again fed directly from the power supply for the remainder of the cycle.

Thus, during normal operation of the press, the NOR gate input terminals 238 and 234 never simultaneously have low potentials, and as a result, the output terminal of the NOR gate is maintained at a low state. It can be seen in FIG. 5, that for the first 180° of crankshaft rotation the input terminals are at unlike potentials, from 180° to 190° both inputs are at a high potential, from 190° to 200° the terminals are at unlike potentials, from 200° to 210° the terminals are both at high potentials, and from 210° through the remainder of the cycle unlike potentials again exist at the input terminals. Accordingly, during normal operation of the press, the low potential at the output terminal 250 is communicated to the set point 252 of the latch 254 causing a high potential to be maintained at the latch output terminal 255. This high potential feeds through the transmission gate 258 and output point 256 to the input terminals 260 and 261 of the respective inverting buffers 264, 265 creating low potentials at their outputs 268, 269. The low potential at the inverting buffer output terminal 269 creates a low potential at the base of the transistor 270 which renders it nonconductive so that there is no current flow through the low load indication light 175.

The low potential at the output terminal 268 of the inverting buffer 264 is communicated to the input terminal 162 of the NOR gate 161. The other input terminal 160 of the NOR gate also has a low potential during normal operating conditions, as previously discussed, since there would be no overload condition. The similar low potentials at the input terminals 162 and 160 of the NOR gate 161 cause a high potential to be maintained at the output terminal 164 which feeds the base of the transistor 165. The transistor 165 is therefore conductive causing a high potential at its emitter terminal for feeding the base of transistor 170 rendering it conductive. As a result, current is permitted to flow from the DC power supply 56 through the main control relay 93 for maintaining the clutch control switch for the press in a closed operating condition.

In the event that the loading on the press member does not exceed the minimum loading set on the low load control dial 205, the transducer signal to the gate terminal 189 of the rectifier 190 will not exceed the reference voltage at the cathode terminal 199. As a result, the SCR 190 will not be triggered for its usual short impulse during that cycle of operation. The anode terminal 198, therefore, will remain at a high potential feeding the base of the transistor 215 which in turn will maintain a low potential at the base of transistor 220 and a high potential at the input terminal 224 of the timer 225. Thus, during such an underloaded condition the timer 225 will not be actuated and a low potential will be maintained at the input terminal 228 of the NOR gate 229 throughout the complete cycle. In FIG. 5, the dotted line designated 277 indicates the low potential of the timer output from 180°-210° of crankshaft rotation during the unloaded condition.

Since the cam 240 actuates the switch 238 in the same manner during each cycle of the press, whether during an underloaded or normal condition, the signal to the input terminal 234 during an underloaded condition will be the same as previously described, i.e., high except for the short interval between 190° and 200° of crankshaft rotation when the switch 238 is closed. Thus, during an underloaded condition, upon closure of the switch 238 both input terminals 228 and 234 of the NOR gate 229 will have low potentials which will trigger the gate terminal 250 thereof raising the output to a high potential. The high potential at the NNOR gate output terminal 251 will then feed the latch set point 252 causing low potentials at the latch otput 255, point 256, and inverter buffer input terminals 260 and 261, which in turn causes the respective output terminals 268 and 269 to go high. The high potential at the output terminal 269 feeds the base of the transistor 270 rendering it conductive so as to cause a current flow through the underload indication light 175, thereby energizing the light to indicate the underloaded condition.

Simultaneously, the high potential at the inverter buffer output terminal 268 raises the potential at the NOR gate input terminal 162. Since the NOR gate 161 will then have unlike inputs the output terminal 164 is reduced to a lower state drawing down the base of the transistor 165 which in turn lowers the potential of the emitter terminal of that transistor and the base of the transistor 170. As a result, the transistor 170 will assume a nonconductive state and prevent further current flow through the main control relay 93 de-energizing the relay causing the main clutch control switch for the press to be opened to shut down the press, all simultaneously with activation of the underload indicator light 175.

In accordance with another aspect of the invention, the high load limiting circuit 45 and the low load limiting circuit 46 each have memory means for holding the circuitry in an overload or underload indicating condition even though the main power supply for the system is interrupted following an overload or underload. It will be seen that upon firing of the set point 135 of the latch 136 upon an overload or the firing of the set point 252 of the latch 255 upon an underload the output of the respective latch will be reversed and will be maintained in a triggered condition so long as the latch remains energized. In order for the latches to remain in an energized and latch condition in the event that the main power supply 56 for the system should be interrupted during overload or underload, a battery 280 is provided for independently energizing the latches in such case. Thus, it will be seen that upon firing of the set point of either the latch 136 or 255, the latch will remain in a set condition even through the main power supply for the system might be interrupted. When the main power supply is reinstated, the overload indication light 92 or underload indication light 175, as the case may be, will again be energized to indicate the condition of the press that resulted in the shut down.

To maintain the battery 280 in a fully charged condition when not being used to energize the latches, means are provided for continually charging the battery from the main power supply 56. In this case, the DC power supply 56 is coupled from an input terminal 281 to ground through zener diodes 284, 285, and 286. By connecting the positive terminal of the battery 280 to a point between the zener diodes 285 and 286 a portion of the voltage from the DC power supply may be drawn off for charging of the battery. The positive terminal of the battery is fed from the connection between the zener diodes 285, 286 through a resistor 288 and directional diode 289, the latter of which is provided to block current flow to ground during any period that the latches must be energized by the battery 280. Likewise, a directional diode 290 is provided to block current flow to ground from the main power supply terminal 133.

For resetting the latches following an overload or an underload, the latches 136 and 255 have respective reset points 291 and 292 which are coupled to the power supply 56 through a normally open manual switch 294. It is only after the switch 294 is manually operated following an overload or underload that the triggered latch will be reset to its original condition. It will be understood that the reset button 116 for the high overload control SCR 95 may be tied to the latch reset button 294 so that upon resetting of the latches the button 116 opens the line connecting the SCR to the power supply. To facilitate resetting of the SCR 95 to a nonconductive state, a capacitor 295 is connected between its cathode terminal 97 and the reset switch 116. The resets 116 and 294 preferably may be actuated from a single button 303 in the front panel of the monitor.

In accordance with still another feature of the invention, the low load limiting circuit 46 may be utilized to count the production of the press. For this purpose, in the illustrated embodiment a production counter 300 is coupled to the output of the timer 225 through a diode 301, a resistor 302, and a transistor 304, the emitter of which is grounded and the collector of which is connected to the DC power supply through a line which includes the counter. The timer 300 may be of a conventional type having a numerical display that will advance one-half digit upon being energized and the other half-digit upon de-energization. It has been shown above that during normal operation of the press the timer 225 is triggered on each working stroke of the press causing the timer to conduct for a short interval. During such activation of the timer, its output will feed the base of the transistor 304 causing it to become conductive to energize the counter and advance the readout one-half digit. At the end of the timing cycle, the transistor will return to its nonconductive state, de-energizing the counter to complete the digitation. Since during normal operation of the press the timer is activated each time a load is incurred during a working stroke, parts produced by the press may thereby be easily counted. If the press is emplty during a working stroke the usual minimum loading would not be exceeded and neither the timer nor the counter would be activated.

The low load limiting circuit of the present invention also may be used as a broken wire detector for the system. It is known that the force carrying members of the press will incur certain minimal loadings, such as on the order of 4 or 5% of their rated capacity, even when the press is running empty. Thus, if the low load control dial 205 is set to a value below that, such as at 2 or 3%, and the SCR 190 and timer 225 are not triggered during a cycle of the press, it will be known that one or more of the wires leading from the transducers are disconnected or broken, or that the monitoring system is otherwise malfunctioning, and an inspection may be made.

From the foregoing, it can be seen that the load monitoring system of the present invention is both versatile and reliable. The system is adapted to detect overloading, underloading, count production, and detect loss of loading or broken wires. In addition, the system includes memory means for indefinitely maintaining an overload or underload indication even though the main power supply for the system might be interrupted. Finally, the electronic circuitry utilizes solid state logic for reliable and quick operation and is of a design which lends itself to economical manufacture.

We claim as our invention:

1. A system for monitoring loads that are cyclically applied to a force carrying member comprising mounting means fixed to said member substantially in line with the stress to be detected, a transducer interposed between said mounting means and having a pair of output terminals with a piezoelectric crystal therebetween for providing at said output terminals an electrical signal substantially proportional to the stress applied to said member, load detector means for providing an output indication upon activation, detector control means coupled to said transducer terminals, means for selectively establishing a reference voltage at said control means, said control means being actuated during a loading cycle when the transducer signal to said control means exceeds said reference voltage by a pedetermined amount, and means responsive to the failure of said control means to be actuated during a loading cycle for activating said load detector means.

2. The load mounting system of claim 1 in which said detector control means includes a control rectifier having an anode, cathode, and gate, means directing said transducer signals to said rectifier gate, said means for establishing said reference voltage including a voltage divider coupled to said cathoe, said rectifier being rendered conductive when said transducer signal to said gate exceeds said reference voltage by a predetermined amount during a loading cycle, and means responsive to the failure of said rectifier to conduct during a loading cycle for actuating said load detector means.

3. The load monitoring system of claim 2 including solid state logic means coupling said load detector means to said rectifier.

4. The load monitoring system of claim 2 including means coupled to said voltage divider to permit the setting of a desired minimum loading on said member during a loading cycle, and said detector means being actuated when the loading on said member fails to exceed said preset amount during a loading cycle.

5. The load monitoring system of claim 4 in which said load detector means includes a light that is energized in response to the failure of said rectifier to be rendered conductive during a working cycle.

6. The load monitoring system of claim 4 in which said detector means includes a relay the conductive state of which is reversed in response to the failure of said rectifier to be rendered conductive during a loading cycle on said member.

7. The load monitoring system of claim 2 including means for limiting the conductive state of said rectifier to a relatively short interval in relation to the loading cycle each time said rectifier is rendered conductive.

8. The load monitoring system of claim 7 in which said means for limiting the conductive state of said rectifier includes a high impedance resistor coupled between said rectifier anode and a DC power supply.

9. The load monitoring system of claim 8 in which said means for limiting the conductive state of said rectifier includes means for blocking current flow from said rectifier cathode to said voltage divider.

10. A system for monitoring loads that are cyclically applied to a force carrying member comprising a transducer mounted on said member for generating an electrical output signal substantially proportional to the load exerted on said member, load detector means for providing an output indication upon actuation, detector control means coupled to said transducer, means for selectively establishing a reference voltage at said detector control means, said detector control means being rendered conductive during each loading cycle when the transducer signal to said control means exceeds said reference voltage by a predetermined amount, and means responsive to the failure of said control means to be rendered conductive during a loading cycle for activating said detector means.

11. The load monitoring system of claim 10 in which said transducer includes a pair of output terminals with a piezoelectric crystal therebetween for generating output signals in response to the loading of said member, and means for limiting the conductive state of said detector control means to a relatively short period in relation to the loading cycle each time said control means is rendered conductive.

12. The load monitoring system of claim 11 including production counter means, and means responsive to conduction of said detector control means for activating said counter means.

13. The load monitoring system of claim 11 including logic means coupled between said detector control means and said detector means, said logic means having at least two input terminals, means for applying to one of said logic means input terminals a similar voltage sequence during each loading cycle, means for applying to a second of said logic means input terminals one voltage sequence if said transducer voltage exceeds said references voltage during a loading cycle and a second voltage sequence if the transducer signal fails to exceed said reference voltage during said loading cycle, and said logic means being triggered in response to said second voltage sequence to said second input terminal for actuating said load detector means.

14. The load monitoring system of claim 13 including a timer for controlling said voltage sequences to said second input terminal, said timer being triggered in response to a transducer signal that exceeds said reference voltage during a loading cycle, said timer upon triggering being operative to produce a voltage at said second logic means input terminal for a predetermined relatively short interval in relation to the loading cycle, and said timer being maintained in an untriggered condition during a loading cycle in which said transducer signal does not exceed said reference voltage.

15. The load monitoring system of claim 14 in which said means for applying said voltage sequence to said one logic means input terminal includes a DC power supply, means coupling said DC power supply to said one input terminal to provide an input voltage at said terminal, and means for interrupting the voltage to said one input terminal for a predetermined relatively short interval during each loading cycle at a point in time so as to be within the period said timer is activated when said transducer signal exceeds said predetermined reference voltage.

16. A system for monitoring loads that are cyclically applied to a force carrying member comprising a transducer mounted on said member for generating an electrical output signal substantially proportional to the load exerted on said member, load detector means for providing an output indication upon actuation, circuit means coupled between said transducer and said detector means, said circuit means including logic means having at least two input terminals, means for applying to one of said logic means input terminals a similar voltage sequence during each loading cycle, means for applying to a second of said logic means input terminals one voltage sequence if the loading on said member exceeds a preset value during a loading cycle and a second voltage sequence if the loading fails to exceed said preset value during said loading cycle, and said logic means being operable in response to said second voltage sequence to said second input terminal for actuating said load detector means.

17. The load monitoring system of claim 16 in which said circuit means includes a timer for controlling said voltage sequences to said second input terminal, said timer being triggered in response to a transducer signal generated when the loading on said member exceeds said predetermined value during a loading cycle, said timer upon triggering being operative to produce a voltage at said second logic means input terminal for a predetermined relatively short interval in relation to the loading cycle, and said timer being maintained in an untriggered condition during a loading cycle in which said loads on said member do not exceed said preset value.

18. The load monitoring system of claim 17 in which said means for applying said voltage sequence to said one logic means input terminal includes a DC power supply, means coupling said DC power supply to said one input terminal to provide an input voltage at said terminal, and means for interrupting the voltage to said one input terminal for a predetermined relatively short interval during each loading cycle at a point in time so as to be within the period said timer is activated when the loading on said member exceeds said predetermined value.

19. The load monitoring system of claim 17 in which said circuit means includes a latch having a set point and an output point, and said logic means being responsive to an output signal from said timer for generating an output signal to said latch set point, and said latch upon triggering of set point being operative to maintain said circuit means in a condition for activating said detector means.

20. The load monitoring system of claim 17 including a main power supply means for normally supplying power to said circuit means and for energizing said latch, and battery means for independently maintaining said latch in an energized condition in the event of an interruption in said main power supply.

21. The load monitoring system of claim 17 including a monitoring light coupled between the output of said timer and ground for indicating the triggered condition of said timer during each loading cycle.

22. The load monitoring system of claim 17 including a counter connected to the output of said timer for counting the loading cycles in which said loading on said member exceeds said predetermined value.

23. A system for monitoring loads that are cyclically applied to a force carrying member comprising mounting means fixed to said member substantially in line with the stress to be detected, a transducer mounted on said member and having a pair of output terminals with a piezoelectric crystal interposed therebetween for generating at said output terminals an electrical signal substantially proportional to the stress applied to said member, overload detector means for providing an output inication upon activation, high load limit circuit means coupled between said transducer and said overload detector means, said high load limit circuit means being operable in response to a signal from said transducer for activating said overload detector means when the loading on said member exceeds a predetermined high value during a loading cycle, underload detector means for providing an output indication upon actuation, low load limit means coupled between said transducer and said underload detector means, and said low load limit circuit means being operable to activate said underload detector means when the loading on said member fails to reach a predetermined minimum value during a loading cycle.

24. The load monitoring system of claim 23 including overload detector control means coupled to said transducer terminals, means for selectively establishing a reference voltage at said overload detector control means, said overload detector control means being activated during a loading cycle when the transducer signal to said control means exceeds said reference voltage by a predetermined amount, means responsive to activation of said overload detector control means for activating said overload detector means, underload detector control means coupled to said transducer terminal, means for selectively establishing a reference voltage at said underload detector control means, said underload detector control means being activated during a loading cycle when the transducer signal to said control means exceeds said reference voltage by a predetermined amount, and means responsive to the failure of said underload detector control means to be actuated during a loading cycle for activating said underload detector means.

25. The load monitoring system of claim 23 including a main control relay, said overload detector means including an overload indicator light, said high load limit circuit means being responsive to an overloading of said member to energize said overload indicator light and reverse the conductive state of said main control relay, said underload detector means including an underload indicator light, and said low load limit circuit means being responsive to the failure of said member to incur said minimum loading during a loading cycle for energizing said low load indication light and reversing the conductive state of said main control relay.

26. The load monitoring system of claim 23 including means for indefinitely maintaining said high load and low load limiting circuits in condition for actuating the respective overload and underload detector means following actuation of either of said overload or underload detector means.

27. The load mounting system of claim 23 in which said low load limit circuit means includes a control rectifier having an anode, cathode, and gate, means directing said transducer sequals to said rectifier gate, means for establishing a reference voltage at said cathode, said rectifier being rendered conductive when said transducer signal to said gate exceeds said reference voltage by a predetermined amount during a loading cycle, and means responsive to the failure of said rectifier to conduct during a loading cycle for actuating said underload detector means, said high load limit circuit including a control rectifier having an anode, cathode, and gate, means directing said transducer signals to said rectifier gate, means for establishing a reference voltage at said cathode, said rectifier being rendered conductive when said transducer signal to said gate exceeds said reference voltage by a predetermined amount during a loading cycle, means responsive to said rectifier being rendered conductive for actuating said overload detector means.

28. The load monitoring system of claim 27 in which said low load limit circuit includes logic means coupled to the anode of said low load limit circuit rectifier, said logic means having at least two input terminals, means for applying to one of said logic means input terminals a similar voltage sequence during each loading cycle, means for applying to a second of said logic means input terminals one voltage sequence if the loading on said member exceeds a present value during a loading cycle and a second voltage sequence if the loading fails to exceed said present value during said loading cycle, and said logic means being operable in response to said second voltage sequence to said second input terminal for actuating said underload detector means.

29. The load monitoring system of claim 28 in which said low limit circuit means includes a timer for controlling said voltage sequences to said second input terminal, said timer being triggered in response to a transducer signal generated when the loading on said member exceeds said predetermined value during a loading cycle, said timer upon triggering being operative to produce a voltage at said second logic means input terminal for a predetermined relatively short interval in relation to the loading cycle, said timer being maintained in an untriggered condition during a loading cycle in which said loads on said member do not exceed said preset value, and said means for applying said voltage sequence to said one logic means input terminal includes a DC power supply, means coupling said DC power supply to said one input terminal to provide an input voltage at said terminal, and means for interrupting the voltage to said one input terminal for a predetermined relatively short interval during each loading cycle at a point in time so as to be within the period said timer is activated when the loading on said member exceeds said predetermined value.

30. The load monitoring system of claim 29 in which said low limit circuit means includes a latch having a set point and an output point, and said logic means being responsive to an output signal from said timer for generating an output signal to said latch set point, and said latch upon triggering of said set point being operative to maintain said circuit means in a condition for activating said underload detector means, and said high load limit circuit including a latch having a set point and an output point, means for triggering the set point of said high load limit latch in response to the loading on said member exceeding said predetermined high value, and said high load limit circuit latch upon triggering of its set point being operative to maintain said circuit means in condition for activation of said overload detector means.

* * * * *